United States Patent [19]
Polin

[11] Patent Number: 5,615,603
[45] Date of Patent: Apr. 1, 1997

[54] BAKING OVEN, PARTICULARLY FOR BREAD OR CONFECTIONERY

[75] Inventor: Antonio Polin, Verona, Italy

[73] Assignee: Ing. Polin & C. S.p.A., Verona, Italy

[21] Appl. No.: 494,717

[22] Filed: Jun. 26, 1995

[30] Foreign Application Priority Data

Jul. 29, 1994 [IT] Italy ................ VR94A0071

[51] Int. Cl.⁶ ............... A23L 3/00; A21B 1/00; A21B 1/08; A47J 37/00
[52] U.S. Cl. ............... 99/331; 99/448; 99/476; 126/21 A; 219/400
[58] Field of Search ............... 99/352, 427, 448, 99/476–479, 325–334; 126/21 A; 219/400, 401; 432/215; 34/212, 219, 389

[56] References Cited

U.S. PATENT DOCUMENTS

| | | | |
|---|---|---|---|
| 3,521,459 | 7/1970 | Rath | 99/476 |
| 3,943,842 | 3/1976 | Bills et al. | 34/197 |
| 4,462,383 | 7/1984 | Henke et al. | 126/21 A |
| 4,480,535 | 11/1984 | Jaxmar et al. | 99/476 |
| 4,676,152 | 6/1987 | Tsuji et al. | 99/483 |
| 4,823,766 | 4/1989 | Violi | 99/473 |
| 5,272,963 | 12/1993 | Del Fabbro | 126/21 A |
| 5,322,007 | 6/1994 | Caridis et al. | 99/427 |
| 5,335,590 | 8/1994 | Crump, III et al. | 99/477 |
| 5,373,780 | 12/1994 | Bianco | 312/236 |
| 5,394,791 | 3/1995 | Vallee | 99/427 |
| 5,423,248 | 6/1995 | Smith et al. | 99/476 |

Primary Examiner—Timothy F. Simone
Attorney, Agent, or Firm—Browdy and Neimark

[57] ABSTRACT

The present invention relates to a baking oven, particularly for bread or confectionery. It consists substantially of a closed compartment within which a plurality of cooking surfaces are envisaged, fixed or mobile, heated, and between which a hot air flow may circulate. These cooking surfaces are heated by first heating means, whilst the hot air flow above the cooking surfaces is heated by second heating means, independent of the first heating means. First measuring and adjustment means are also envisaged for the temperature of the cooking surfaces, and second measuring and adjustment means for the temperature of the air flow.

11 Claims, 4 Drawing Sheets

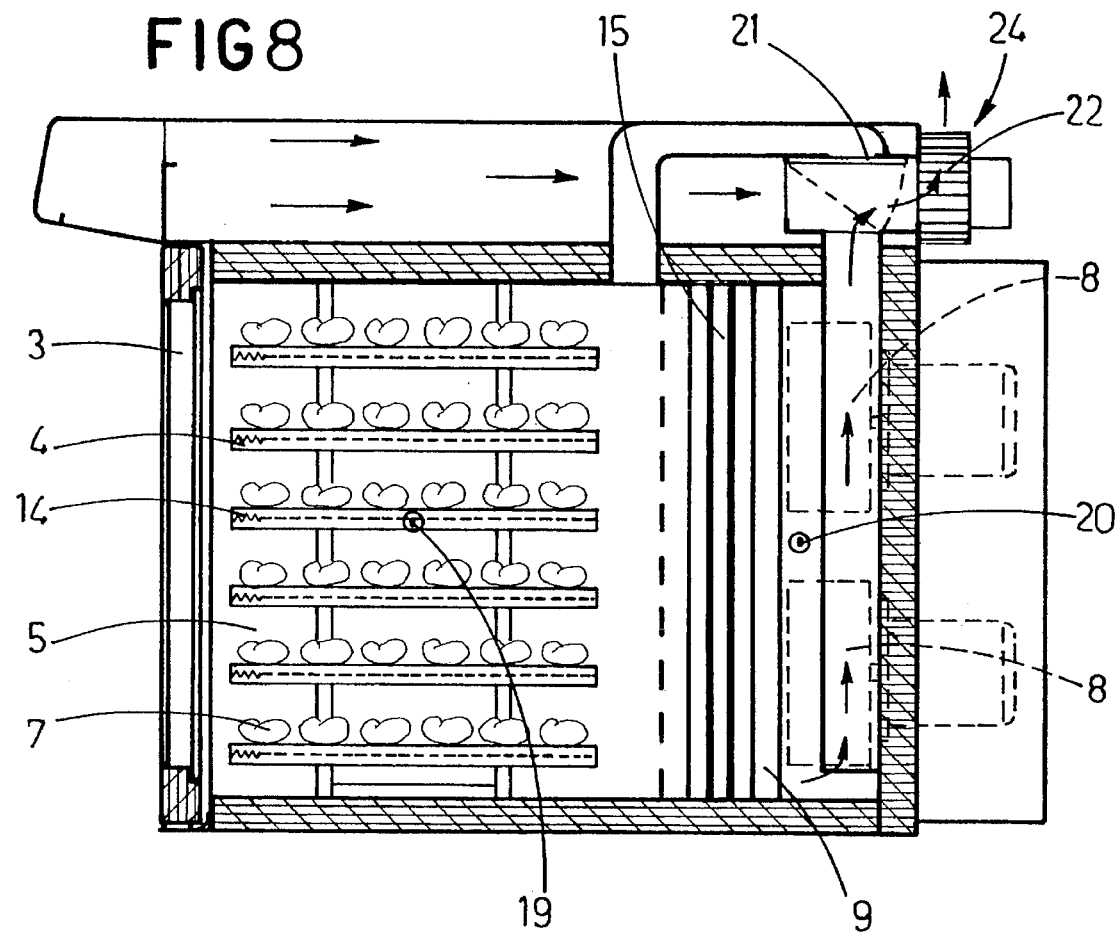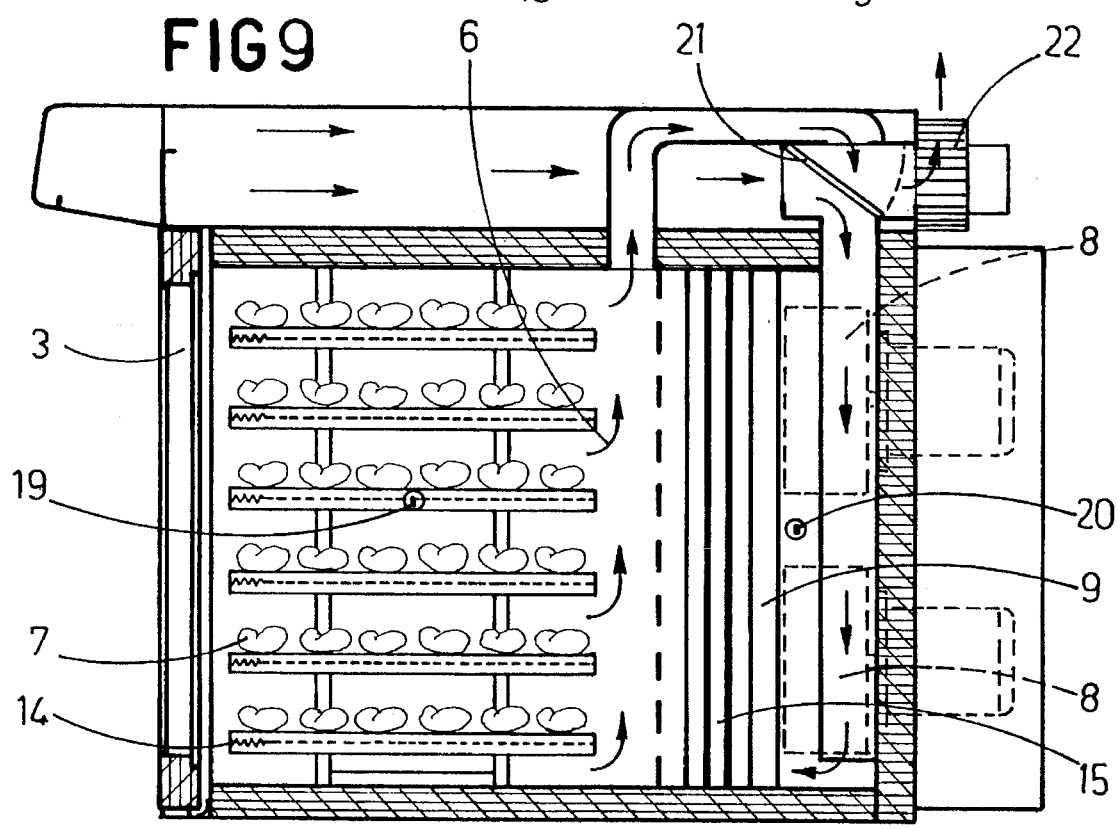

BAKING OVEN, PARTICULARLY FOR BREAD OR CONFECTIONERY

BACKGROUND of the INVENTION

1. Technical Field

The present invention relates to a baking oven, particularly for bread or confectionery. Such a baking oven is ideal for use both in bakeries which produce bread or confectionery (either on a small-scale or at industrial level) and in canteens and restaurants, where the use of frozen bread or confectionery which require on-site baking is becoming increasingly frequent.

2. Prior Art

As is known, in the type of oven described, the heat source may be a burner or electric heating elements, and the ovens may be separated into two categories: having fixed or rotary cooking surfaces.

In the latter type of oven, according to the prior art, heat is transferred into the oven and yielded to the product exclusively by means of hot air convection.

As a result, rotary ovens of the known type are unsuitable for baking delicate products, which may be damaged by the hot air flow, nor are they suitable for baking bread or those products which require a strong supply of heat at the base, that is to say, at the area in which they rest against the cooking surfaces.

As regards ovens with fixed cooking surfaces, these may use as a heat source either the forced circulation of hot air, or heat exchangers (e.g.: of the fire tube type), or electric heating elements.

In accordance with the prior art, ovens with fixed cooking surfaces, which use both cooking surface heating and forced air circulation, may substantially be divided into three types. The first type has heated cooking surfaces which separate various independent chambers, each chamber having an air flow, which does not supply heat, produced by a fan. Each independent chamber has its own access door.

This first type of oven with fixed cooking surfaces has, as is known, several disadvantages: since the chambers are independent, the number of cooking surfaces is limited; operating costs are relatively high because each chamber requires its own heating unit, and construction costs are equally high given the number of compartments and doors necessary; moreover, the overall dimensions of the oven are quite considerable.

A second type of oven has heated cooking surfaces positioned in a single chamber, with access door, an air flow which does not supply heat, produced by a fan envisaged within the chamber. A trolley with a number of shelves corresponding to the number of fixed cooking surfaces is also envisaged. The product is loaded onto the trolley, which is then placed in the oven's baking chambers, where the trolley shelves lie above the fixed cooking surfaces.

This second type of oven allows the economic disadvantage of the first type of oven mentioned to be resolved at least in part, although its own disadvantage lies in the fact that the heat yield from fixed cooking surface to product is not optimum due to the presence of the trolley shelf between them.

A third type of oven has a set of fixed cooking surfaces which are not heated. In this type of oven the product is heated by a forced convection hot air flow. The oven has a single door (which allows the insertion of a trolley ready-loaded with the product to be baked) which is, in turn, divided into a series of smaller doors, equivalent in number to the cooking surfaces.

This type of oven has the following main disadvantages: the absence of heated cooking surfaces does not permit the baking of those products which require a strong source of heat at the base, and the heat derived exclusively from the forced convection hot air flow does not allow the baking of delicate products, which may be damaged by the air.

The three types of oven mentioned above have not only the disadvantages described, but also significant functional disadvantages and limitations common to all three.

Firstly, such types of known ovens each have a single heat source (e.g.: a burner or electric heating elements, as in the first two cases described, or the forced convection of hot air, as in the third case), with a single temperature control system. With regard to this, it should be noticed that many types of product require a clearly defined ratio between the temperature of the cooking surface and the temperature of the air above (indicated here by the letter "R"). Variation of the said ratio R is impossible in the three types of oven described above, representing a significant functional limitation.

At present, the ratio R may be varied only in electric ovens with independent chambers, in which the temperature of the cooking surface and the temperature of the air at the top or the chambers can be regulated from the outside.

However, even electric ovens have several disadvantages which limit their use: they require a substantial current operating and construction costs are high variations in temperature are slow (therefore, these ovens cannot be used for products which require relatively sudden temperature variations during baking).

It may, therefore, be said that in all conventional ovens, with either fixed or rotary cooking surfaces, rapid variations in the baking temperature (useful for certain products) are impossible, as regards both the cooking surfaces and the air, if the oven is to be kept in optimum condition for the subsequent baking of other products. In reality, the temperature could be varied by adjusting the oven's heat source. However, this would necessitate an excessive amount of time to return the temperature to the operating level. Moreover, the duration of a cycle envisaging temperature variations would be very long using the known types of oven.

SUMMARY of the INVENTION

The aim of the present invention is, therefore, to overcome the afore-mentioned disadvantages and limitations, related to the prior art, by providing a baking oven able to bake products which require stronger heating at the base and/or heating by means of hot air forced convection, and/or which require, in the meantime, variation of the ratio R between the temperature of the cooking surface and the temperature of the hot air above, during the baking cycle, or even variations in the overall temperature during the cycle. This aim, as well as others, is attained by the present invention, a baking oven whose main features are described in the claims. On the basis of the said features, the oven disclosed by the present invention allows:

products to be baked using heated or unheated cooking surfaces, depending on requirements;

products to be baked with or without a hot air flow, depending on requirements;

baking cycles to be completed in various stages;

variations in the ratio between the temperature of the cooking surface and the temperature of the hot air flow above, depending on requirements;

rapid variations in the temperature of the hot air, in accordance with operating requirements.

BRIEF DESCRIPTION of the DRAWINGS

The present invention will now be described in detail, by way of example, with the aid of the accompanying drawings, which illustrate two preferred embodiments (respectively a baking oven with fixed cooking surfaces and a rotary oven), in which:

FIGS. 8 and 9 are schematic cross-sections, similar to FIG. 6, highlighting two characteristic positions of the device which reduces the temperature of the air in the oven.

DESCRIPTION of the PREFERRED EMBODIMENTS

With reference to the accompanying drawings, the oven disclosed by the present invention, in both embodiments illustrated (with rotary cooking surfaces in FIGS. 1 to 5, and with fixed cooking surfaces in FIGS. 6 to 9) consists substantially of a closed compartment 1, delimited by insulated perimeter walls 2 and fitted with an access door 3.

Figure 2:
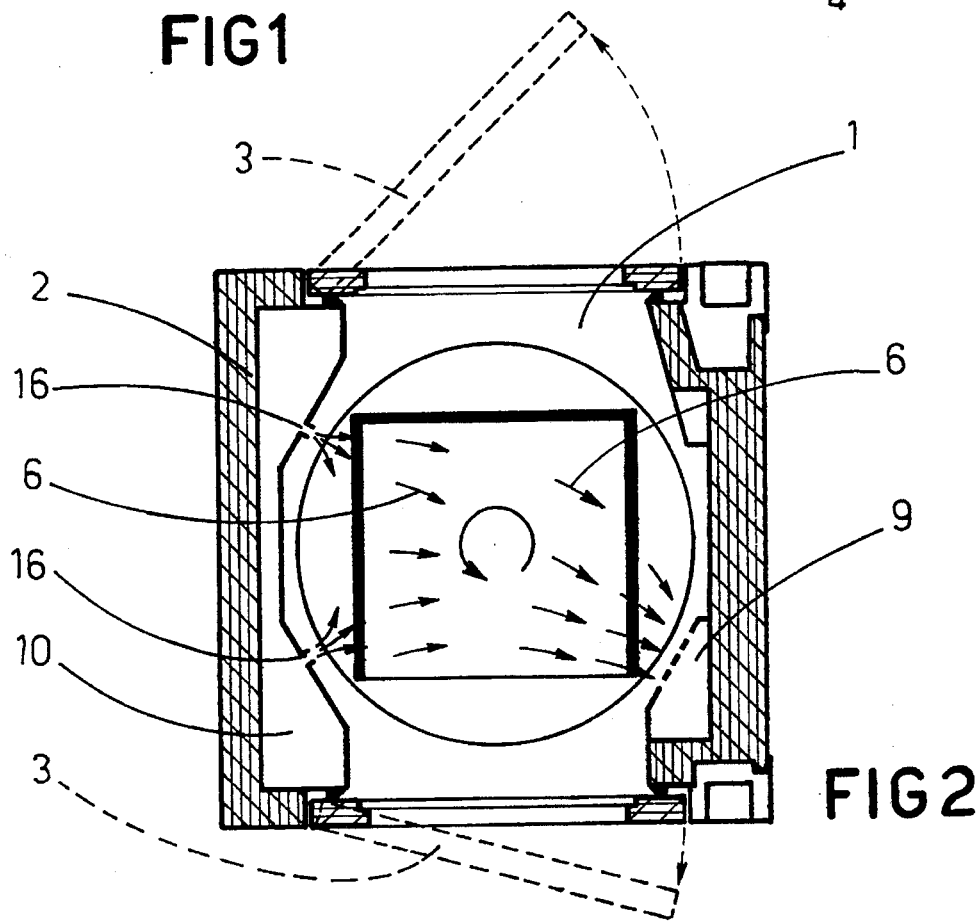
FIG. 2 is a schematic cross-section of the oven shown in FIG. 1, along the line II—II in FIG. 1.

It should be noticed that in the embodiment shown in FIG. 2, relative to the oven with rotary cooking surfaces, two opposite doors 3 are illustrated, designed to facilitate the insertion of products in the oven on one side, and their removal from the other side.

In general terms, within the compartment 1, a series of cooking surfaces 4 is envisaged, one on top of the other, which in turn create sub-compartments 5 each one delimited, below by one of the cooking surfaces 4, and above by the forced convection air flow 6 present above the cooking surface 4 and in contact with the products to be baked 7 thus positioned.

The air flow 6 is produced by a fan unit 8 connected to an intake duct 9 and a delivery duct 10 connected to the compartment 1, and, in any case, to all of the sub-compartments 5.

Figure 1:
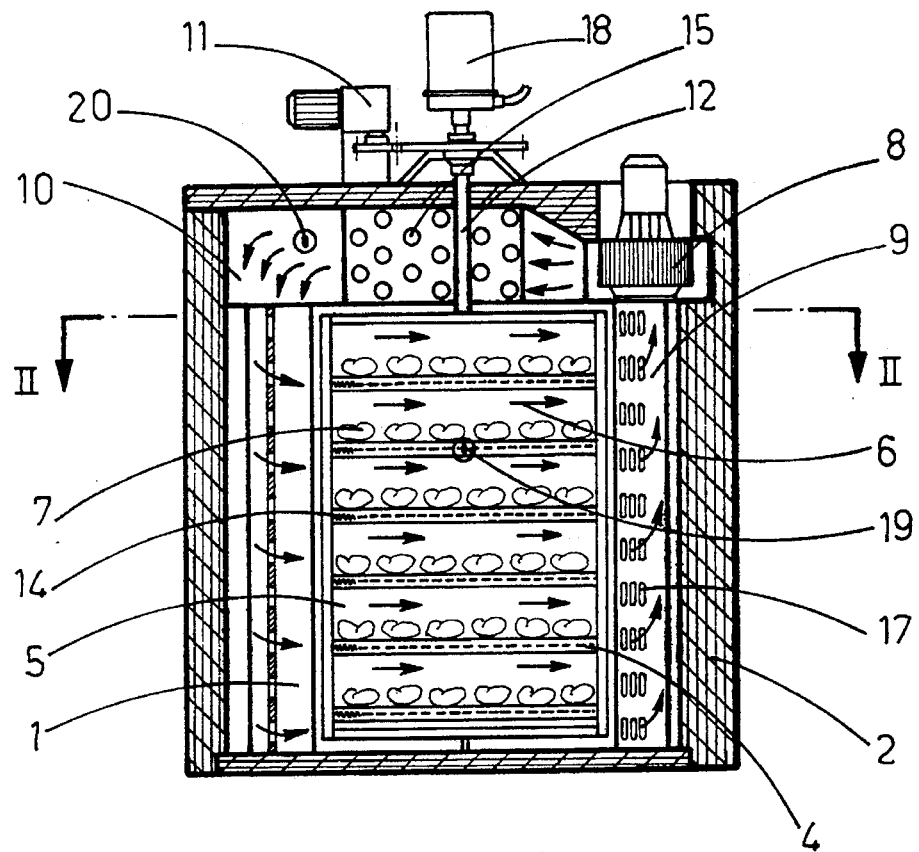
FIG. 1 is a schematic vertical cross-section of the rotary oven disclosed by the present invention.
Figure 7:
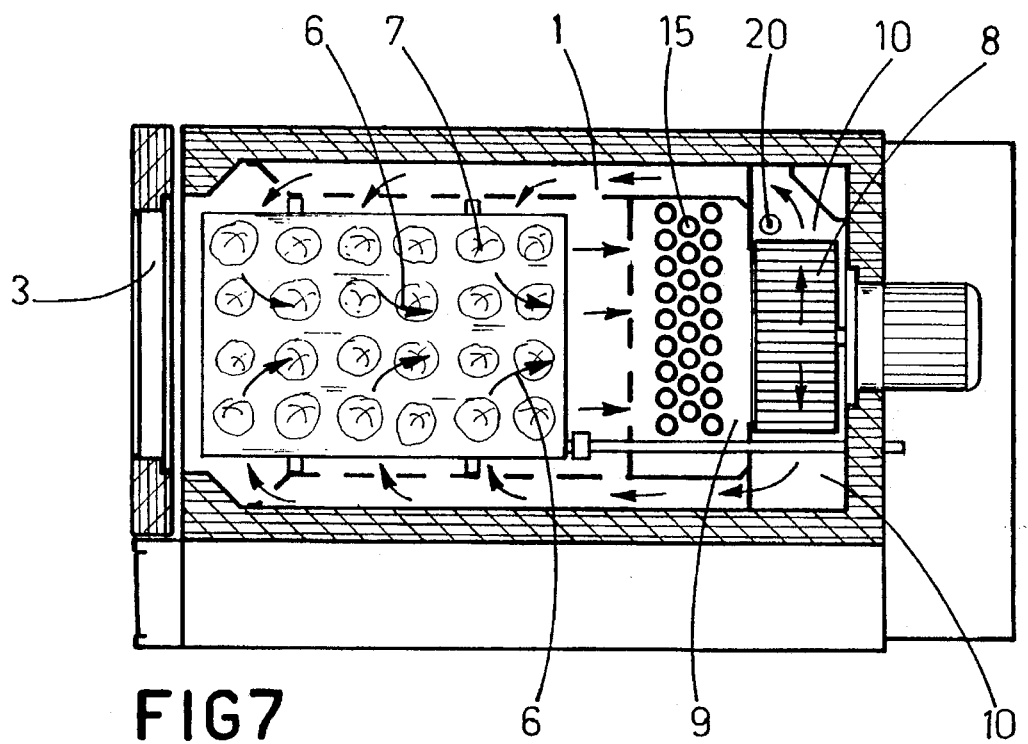
FIG. 7 is a schematic cross-section of the oven illustrated in FIG. 6, along the line VII—VII in FIG. 6.

The arrows in FIGS. 1 and 2 (relative to the oven with rotary cooking surfaces 4) and in FIG. 7 (relative to the oven with fixed cooking surfaces 4) clearly indicate the circulation of the air flow 6.

Figure 3:
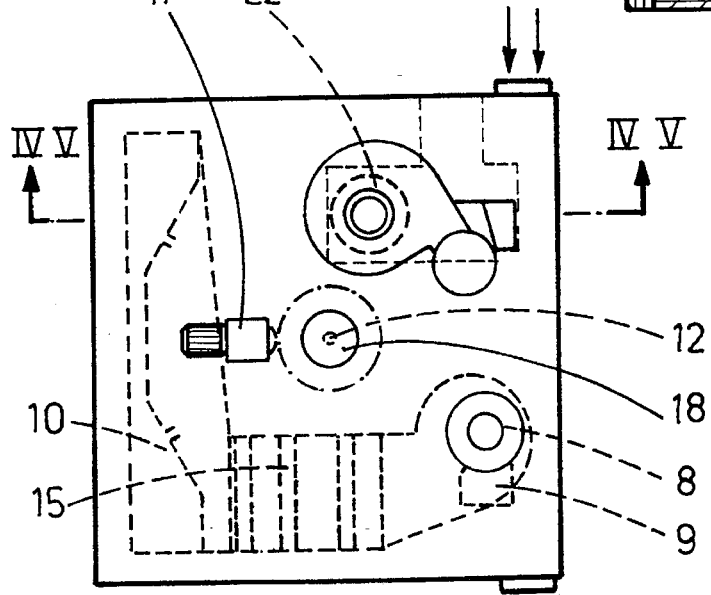
FIG. 3 is a plan view of the oven illustrated in FIG. 1.
Figure 6:
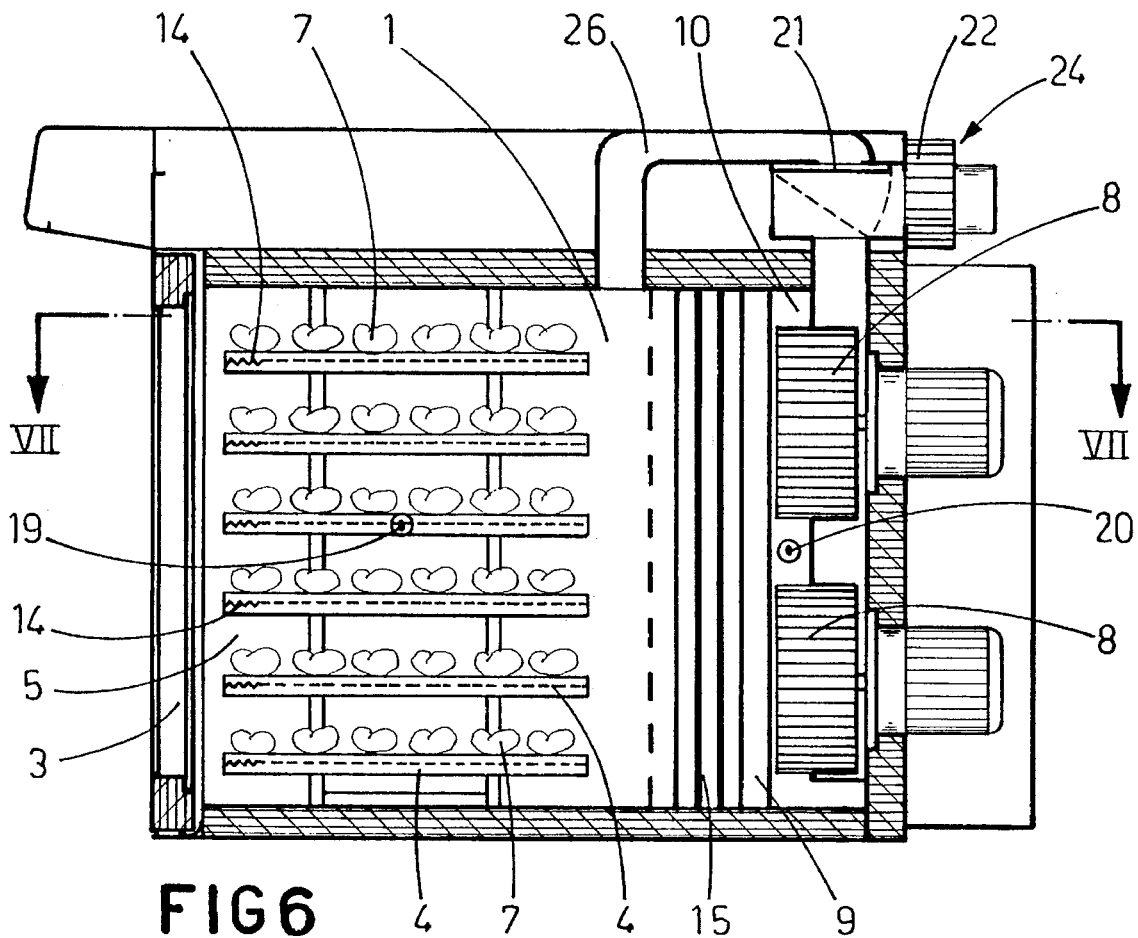
FIG. 6 is a schematic vertical cross-section of the oven with fixed cooking surfaces disclosed by the present invention.

Moreover, with specific reference to FIGS. 1 and 3, the numeral 11 is used to indicate a variable speed motor which drives a vertical shaft 12, causing the trolley bearing the cooking surfaces 4 to rotate.

For both types of oven, with fixed or rotary cooking surfaces, two distinct and independent heating means are envisaged: the first, indicated by the numeral 14, designed to heat the cooking surfaces 4, and the second, indicated by the numeral 15, heating the air flow 6.

In the embodiments illustrated in the accompanying drawings, the first heating means 14 consist of electric heating elements (although any suitable means could be used) housed within the cooking surfaces 4, whilst the second heating means 15 consist of tubular heat exchangers (again, any suitable means could be used) located in the intake duct 9, or delivery duct 10, of the fan unit 8 and being close to the latter (see FIGS. 1 and 7). With reference to FIGS. 1 to 5 (oven with rotary cooking surfaces) the numeral 16 indicates vertical openings in the delivery duct 10, through which the air flow 6 passes into the sub-compartments 5, and from these to the intake duct 9 through the slots 17.

The numeral 18 indicates a connector for supplying power to the cooking surfaces 4. The numerals 19 and 20 indicate, respectively, a first probe (connected to the connector 18) positioned inside a cooking surface 4, and a second probe, positioned inside the delivery duct 10 for the hot air flow 6. The first probe 19 measures the temperature of the cooking surfaces 4 and adjusts it, the probe being connected to a control panel (not illustrated) which adjusts the power supplied to the electric heating elements 14.

The second probe 20 measures the temperature of the air flow 6 and adjusts it, this probe being connected to a control panel which adjusts the heat generator connected to the heat exchangers 15. The said second probe 20 also controls a (rapid) cooling device for the air flow 6 in accordance with the deviation measured (by the probe itself) between the temperature of the air flow 6 in the sub-compartments 5 and a temperature set on the oven's control panel (not illustrated) depending on the operating requirements of the baking cycle envisaged.

Figure 4:
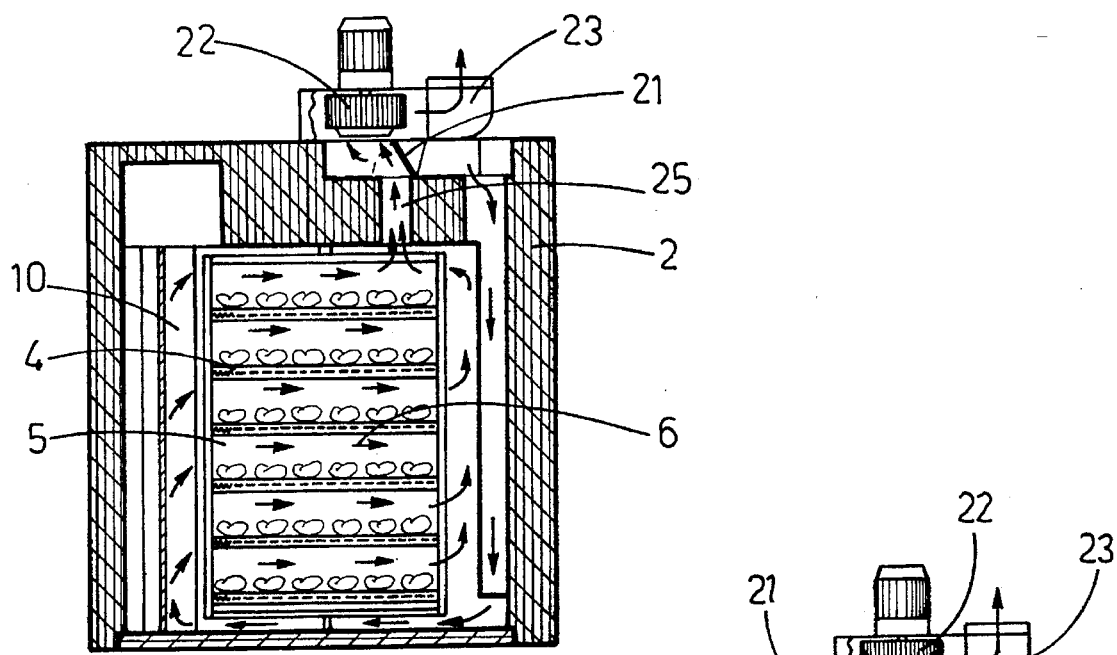
FIGS. 4 and 5 are schematic cross-sections, along the lines IV—IV and V—V shown in FIG. 3, which highlight two characteristic positions of the device which reduces the temperature of the air in the oven.
Figure 5:
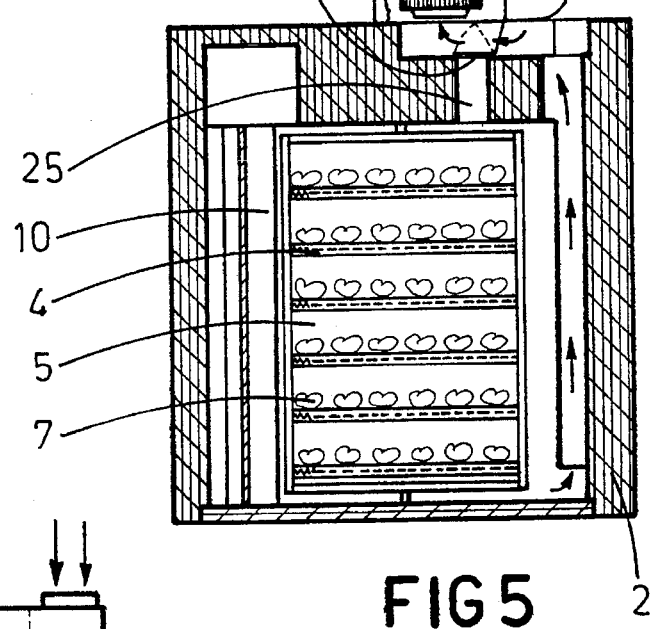

More precisely, the afore-mentioned (rapid) cooling device may, in accordance with the embodiments illustrated in FIGS. 4 and 5 (oven with rotary cooking surfaces) and 8 and 9 (oven with fixed cooking surfaces), consist of a mobile gate valve 21 which can allow the forced convection air flow 6 to communicate with the outside of the oven. For this purpose, an aspirator 22 is envisaged, connected to a delivery tube 23 (24) with an outlet to the outside of the oven, and a suction tube 25 (26) connected to the oven compartment 1.

The gate valve 21 is positioned inside the suction tube 25 (26) near to the aspirator 22 and moves between a closed position (see FIGS. 5 and 8) and an open position (see FIGS. 4 and 9) in which the oven compartment 1 communicates with the aspirator 22.

The form and configuration of the present invention, thus designed for the said objects, may be subject to numerous variations, all encompassed in the original design concept, and all components may be replaced with technically equivalent parts.

What is claimed:

1. A baking oven, particularly for bread or confectionery, consisting of a closed compartment, said closed compartment delimited by insulated perimeter walls and fitted with at least one access door, said closed compartment having a plurality of cooking surfaces which create sub-compartments, each of said sub-compartments delimited below by a cooking surface of said cooking surfaces, and above by a forced convection air flow present above said cooking surface; a fan unit connected to an intake duct and a delivery duct both of which are connected to said compartment, wherein said cooking surfaces are fitted with first heating means and the air flow present above the cooking surfaces is heated by second heating means separated from the first heating means; first temperature measuring and adjustment means for the cooking surfaces being connected to the said cooking surfaces, and second means for measuring and adjusting the temperature of the said air flow.

2. The baking oven according to claim 1, wherein said first heating means comprise heat sources in the cooking surfaces.

3. The baking oven according to claim 1, where the second heating means comprise heat sources positioned inside the delivery duct of the said fan unit.

4. The baking oven according to claim 1, wherein said first temperature measuring and adjustment means for cooking surfaces comprise at least a first probe positioned in a corresponding cooking surface, the said first probe being connected to the first heating means.

5. The baking oven according to claim 1, wherein said second temperature measuring and adjustment means for the air flow consist of at least a second probe positioned inside said delivery duct, the said second probe being connected to the second heating means.

6. The baking oven according to claim 1, said baking over further comprising a device for cooling said forced convection air flow, said device being controlled by the second temperature measuring and adjustment means for the air flow in relation to a deviation measured between the temperature of the air flow in the sub-compartments and a set value for said air flow.

7. The baking oven according to claim 6, wherein said air cooling device comprised a mobile gate valve which allows the forced convection air flow to reach an outside of the oven.

8. The baking oven according to claim 7, wherein at least one aspirator is connected to a delivery tube with an outlet to the outside of the oven and a suction tube in communication with the said forced convection air flow, said gate valve being positioned inside the suction tube and moving between a closed position and an open position corresponding to the communication of the said forced convection air flow with the aspirator.

9. The baking oven according to claim 1, wherein the said cooking surfaces are fixed.

10. The baking oven according to claim 1, wherein said cooking surfaces are mobile.

11. The baking oven according to claim 10, wherein said cooking surfaces rotate about a vertical axis, a drive unit being provided to rotate the said cooking surfaces.

\* \* \* \* \*